April 9, 1957 — H. M. STUELAND — 2,788,138
TRACTOR MOUNTED SCOOP
Filed March 26, 1954 — 2 Sheets-Sheet 1

INVENTOR.
H. M. STUELAND
BY
Roger C. Johnson
ATTORNEYS

April 9, 1957 H. M. STUELAND 2,788,138
TRACTOR MOUNTED SCOOP
Filed March 26, 1954 2 Sheets-Sheet 2

INVENTOR.
H. M. STUELAND
BY
Roger C. Johnson
ATTORNEYS

United States Patent Office 2,788,138
Patented Apr. 9, 1957

2,788,138
TRACTOR MOUNTED SCOOP
Harold M. Stueland, East Moline, Ill., assignor to Deere & Company, Moline, Ill., a corporation of Illinois
Application March 26, 1954, Serial No. 418,918
2 Claims. (Cl. 214—140)

The present invention pertains to an earth leveler of the type mounted on the rear of a tractor containing power lift means for bringing the leveler to and from ground-engaging and transport positions. More particularly it pertain to a scoop type leveler capable of containing the dirt or material dug and carrying it to a desired dumping area. More specifically the invention relates to means of connecting and mounting the scoop on the tractor.

A common means employed in mounting a scoop type leveler on a tractor comprises the use of a pair of drawbar arms pivotally secured at their forward ends to the tractor draft arms and at their rear ends to the scoop sides. Consequently, the scoop is free to rock about the rear end of the drawbars while the drawbars themselves freely swing up and down about their forward ends. Upon the draft arms being raised there exists the gravitational tendency for both the scoop and drawbar to swing downwardly. Therefore, means are provided to limit the downward swinging of both. Collapsible means usually in the form of toggle linkages are connected to the rear of the scoop and extend upwardly to be connected directly to, or to parts connected to, the upper trail behind link that projects rearwardly from the tractor. In their extended form the linkages limit the downward swinging of the scoop relative to the drawbar. They are also employed in dumping of the materials in the scoop by serving as means to raise the rear of the scoop forcing the material out the front.

To move and maintain the scoop in the transport position means also must be provided to limit the downward swinging of the drawbars relative to the tractor draft arms. The usual method is by providing some form of stop means on the scoop itself disposed in the path of swinging of the drawbars that will limit the latter's movement.

I propose in this invention to provide independent means anchored to the tractor and extending to the drawbars to serve as stops or limiting means and it is therefore the main object of this invention to employ a pair of flexible elements which for my particular form of invention are link chains that extend from the tractor to the drawbars and that will upon lifting of the draft arms become taut and in such disposition limit the downward swinging of the drawbars. Also provided, will be a simple means for adjusting the length of chain between the tractor and the drawbars.

The usual commercial type tractor permits a limited amount of lateral swinging of its draft arms relative to the tractor. For obvious reasons there are advantages of having this lateral movement and particularly so when the implement is in ground engaging position. However, with a scoop of the type described when in transport position and carrying materials, abrupt stopping at the culmination of the lateral arc results in portions of the materials being carried over the sides of the scoop as a result of the momentum built up in the swinging motion. It is therefore desirable and it is the second main object of the invention to eliminate the lateral swinging while the scoop is in transport position. By crossing the aforementioned flexible elements or chains, upon their becoming taut when the draft arms are raised, the crossed elements will automatically eliminate lateral swinging of the scoop relative to the tractor. When the scoop is in ground engaging position the chains will be collapsed and the desired lateral movement will be unimpaired.

Other objects and advantages of the invention will become readily apparent to those skilled in the art as the description taken in conjunction with the accompanying drawings is set forth.

Fig. 3 is a sectional view taken along line 3—3 of Fig. 1

Figure 1:
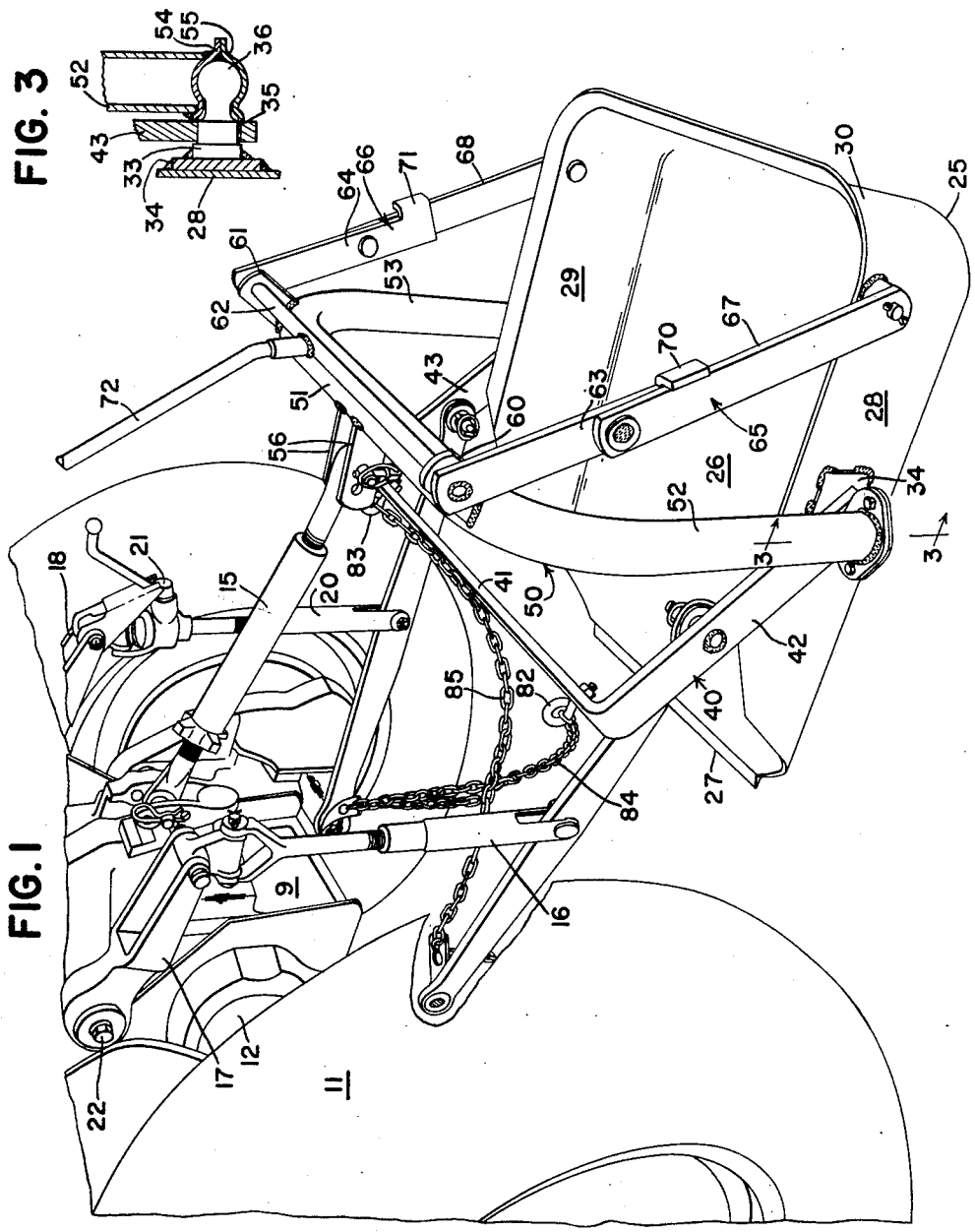
Fig. 1 is a perspective view taken at the rear and to the side of the tractor and leveler showing with the latter in ground engaging position. For clarity, sections of the tractor are removed.

The tractor is of a usual commercial design and for purposes of this application is described generally and only to the extent required to understand fully the invention.

Forming the support for the rear of the tractor is the differential housing 9, and the rear axle contained in the axle housing 12 mounted between two rear wheels 11. Transversely spaced draft arms 13 and 14 are mounted for lateral movement at their forward ends to the axle housing 12 and extend rearwardly. Power lift means comprising a pair of lift arms 17 and 18 are fixed to a rockshaft 22 at their forward ends and at their rear portions are connected to vertically disposed adjustable lift links 16 and 20. The links 16 and 20 are pivotally connected to an intermediate portion of the draft arms 13 and 14 and serve to raise or lower the arms about their forward ends. A length adjusting system designated here in its entirety as 21 is a part of the right link 20 and varies the draft arms in relative vertical disposition. The rockshaft 22 receives power from a system in the tractor and is available for manipulation by the operator. An upper trail-behind link 15 is also mounted on the tractor and projects rearwardly.

The scoop 25 is of a variety having a laterally disposed bottom plate 26 with a front cutting edge 27 and two upwardly turned sides 28 and 29 interconnected at their rear by an upwardly turned back portion 30. Two similar and oppositely disposed hinges 33 (shown in Fig. 3) mounted on the respective sides 28 and 29 forwardly of the center of gravity of the scoop 25 have plates 34 proximate to and fixed as by welding to the sides 28 and 29 and laterally extending sections, each section comprising an enlarged inner circular portion 35 and an outer ball member 36 used in a ball and socket arrangement as later explained.

A drawbar 40 in the form of a first bail member and having a crossbar 41 and two depending transversely spaced parts or arms 42 and 43 that are apertured at their lower ends to fit on the circular portions 35 of the hinges 33 and extend upwardly and forwardly from the hinges 33, is pivotally mounted on the draft arms 13, 14 at an intermediate portion of the depending arms 42 and 43.

A second bail member 50 having respectively a second crossbar 51 and likewise a second pair of depending arms 52 and 53 is pivotally mounted on the ball members 36 of the hinges 33 by socket means comprising upper flanges 54 on each of the lower portions of the arms 52 and 53 and lower socket parts 55.

The upper trail-behind link 15 is articulately connected between two cooperating brackets 56 fixed to the second crossbar 51. Also fixed to the crossbar 51 and extending generally upwardly and rearwardly are a pair of transversely spaced brackets 60, 61 apertured at their upper ends to pivotally receive a transverse dump shaft 62. Fixed to the outer ends of the shaft 62 are two parallel and rearwardly extending members 63 and 64 that are the upper portions of two collapsible or toggle linkages 65, 66 that connect the ends of the shaft 62 to respective rear side portions of the scoop. Two lower parts 67 and 68 of the toggle linkages 65 and 66 are pivotally secured at their lower ends on a pair of hinges 69 fixed to the respective rear side portions of the scoop and are also pivotally secured at their upper ends to a mid-portion of the upper members 63 and 64. Serving to prevent forward collapsing of the toggle linkage are two stop brackets 70, 71 fixed to and directed outwardly from the rear edge of the lower ends of the upper parts 63, 64 so as to intercept and to limit the rearward swinging of the lower parts 67 and 68. Fixed to the shaft 62 and extending upwardly and forwardly is a dump arm 72, the upper end of which extends in proximity of the operator's station.

Two chain brackets 80 and 81 with portions bent inwardly and each inward portion containing a circular aperture forwardly and adjacent to a slot to form keyhole shaped openings 86, 87, are mounted on the tractor proximate to the forward end of the draft arms. Mounted on the crossbars 41 of the drawbar 40 and at the upper ends of the arms 42, 43 are two eyelets 82, 83. A pair of flexible elements here in the form of link chains 84, 85 are linked in the eyelets 82 and 83 at their rear ends and project forwardly and inwardly, crossing one another at their mid-portions and projecting through the openings 86 and 87 where a link of each chain is inserted in the respective slots of the openings 86 and 87.

The operation of the implement above described is as follows:

As can best be shown in Fig. 3, both the drawbar 40 and the second bail member 50 are pivotally mounted on the hinges 33 thus permitting swinging of the drawbar 40, bail member 50, and scoop 25 relative to one another about a transverse axis passing through the hinges 33. The drawbar 40 connection to the draft arms 13 and 14 also permits free fore-and-aft movement of the drawbar about the rear end portions of the draft arms.

The scoop when in the ground engaging position, as shown in Fig. 1 forces the drawbar 40 to be disposed forwardly and the chains to be in relaxed condition. The toggle linkages are in extended form preventing upward tilting of the cutting edges 27.

Figure 2:
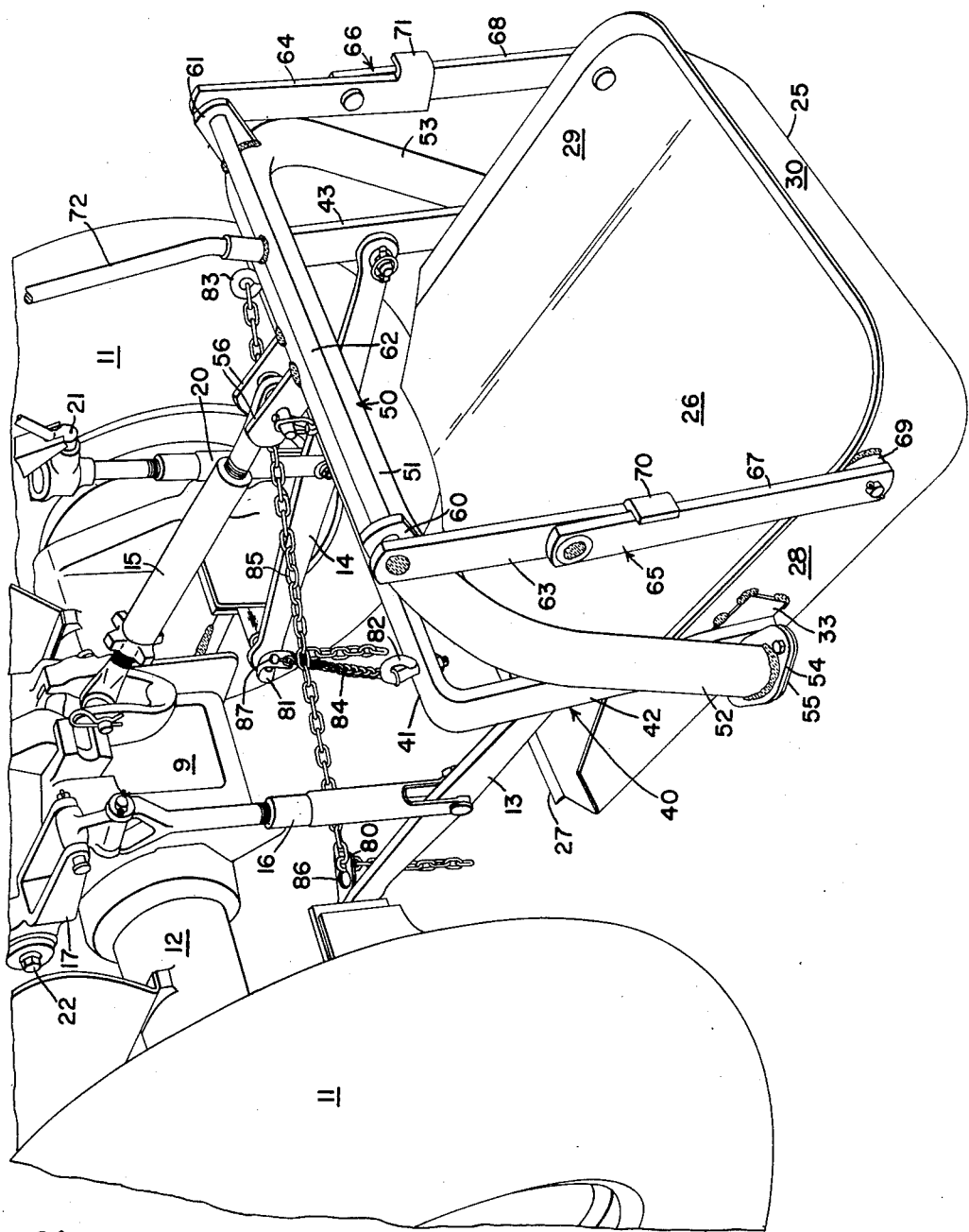
Fig. 2 is similar to Fig. 1 with the perspective somewhat more to the rear and showing the scoop in up or transport position.

As the draft arms are raised to move the scoop to transport position, as shown in Fig. 2, the weight of the scoop forces the upper portion of the drawbar 40 to move rearwardly until both chains are under tension at which point further rearward movement of the drawbar 40 is prevented and in this manner the chains serve as stop means. The weight of the scoop also retains the toggle linkages at their extended maximum length which eliminates downward rocking of the rear of the scoop about the hinge means. Thus it is apparent that the scoop is maintained in a stabilized condition when in a raised position. The crossed chains being under tension and connected to both the tractor and scoop will also eliminate lateral swinging of the scoop relative to the tractor.

The linkage connecting the tractor and the drawbar 40 may be adjusted by drawing the chains through the circular portions of the keyhole openings 86 and 87 to the desired length, and turning the links coinciding with the desired length so as to slide in the adjacent slots of the openings 86 and 87 where they will be restricted from further movement by the adjacent links coming into contact with the slots. Viewing Fig. 2 of the drawings it is fully apparent that adjusting the effective length of the chains 84, 85 will result in a corresponding adjustment of the scoop bottom 26 relative to the horizontal.

The operator may unload the scoop by pulling forwardly on the dump arm 72 with the result that the scoop is tilted forwardly and downwardly on the hinges 33 causing the material to be discharged over the forward cutting edge of the scoop.

While I have shown and described the preferred structure in which the principles of the invention have been incorporated, I do not mean to limit it only to that structure, but to other structures and details which would be readily ascertained by one skilled in the art using the broad general principles of the invention set forth in the claims.

I claim:

1. A scoop-leveler having a laterally disposed bottom plate with a front cutting edge and two upwardly turned sides interconnected at their rear by an upwardly turned back portion, said leveler being of the type mounted for both ground engaging and transporting on the rear of a tractor having a pair of transversely disposed, laterally swingable draft arms projecting rearwardly and connected to power lift means on said tractor for generally up and down movement relative to the tractor about their forward ends, a pair of forwardly extending, transversely spaced drawbars having forward, rear, and intermediate portions, hinge means connecting each of said rear portions to a respective side of said leveler to permit rocking action thereon, pivotal means connecting each of said intermediate portions to a respective draft arm to permit fore-and-aft swinging of said drawbars relative to the draft arms and to cause said forward portions to swing rearwardly upon lifting of the draft arms, a pair of laterally disposed crossed flexible elements connected at their rear ends to respective forward portions of said drawbars and at their forward ends to laterally spaced apart portions on the tractor, said elements being in relaxed disposition when the leveler is in ground position but becoming taut upon rearward movement of said forward portions and serving to limit rearward swinging of said forward portions and to prevent lateral swinging of the leveler relative to the tractor when the draft arms are raised, and means on said leveler for selectively positioning the leveler angularly on said hinge means.

2. A scoop-leveler having a laterally disposed bottom plate with a front cutting edge and two upwardly turned sides interconnected at their rear by an upwardly turned back portion, said leveler being of the type mounted for both ground engaging and transporting on the rear of a tractor having a pair of transversely disposed, laterally swingable draft arms projecting rearwardly and connected to power lift means on said tractor for generally up and down movement relative to the tractor about their forward ends, a pair of forwardly extending, transversely spaced drawbars having forward, rear, and intermediate portions, hinge means connecting each of said rear portions to a respective side of said leveler to permit rocking action thereon, pivotal means connecting each of said intermediate portions to a respective draft arm to permit fore-and-aft swinging of said drawbars relative to the draft arms and to cause said forward portions to swing rearwardly upon lifting of the draft arms, a pair of laterally disposed flexible elements connected at their front and rear ends to the tractor and the forward portions respectively, each of the elements extending diagonally relative to the tractor and extending relative to the other of the elements to be operative when taut to prevent lateral sway of the leveler, said elements being in relaxed disposition when the leveler is in ground position but becoming taut upon rearward movement of said forward portions and serving to limit rearward swinging of said forward portions, and means on said leveler for selectively positioning the leveler angularly on said hinge means.

References Cited in the file of this patent

UNITED STATES PATENTS

| 2,465,831 | Arps | Mar. 29, 1949 |
| 2,648,919 | Brown | Aug. 18, 1953 |
| 2,679,131 | Martinson | May 25, 1954 |

OTHER REFERENCES

Dearborn Motors Publication Form AD-5284. Copyright 1949.